(12) United States Patent
Epple

(10) Patent No.: US 8,435,470 B2
(45) Date of Patent: May 7, 2013

(54) METHOD AND ARRANGEMENT FOR SEPARATION OF $CO_2$ FROM COMBUSTION FLUE GAS

(75) Inventor: Bernd Epple, Brensbach (DE)

(73) Assignee: ALSTOM Technology Ltd., Baden (CH)

( * ) Notice: Subject to any disclaimer, the term of this patent is extended or adjusted under 35 U.S.C. 154(b) by 8 days.

(21) Appl. No.: 12/584,519

(22) Filed: Sep. 8, 2009

(65) Prior Publication Data
US 2010/0086456 A1 Apr. 8, 2010

(30) Foreign Application Priority Data
Oct. 8, 2008 (DE) .......................... 10 2008 050 816

(51) Int. Cl.
*B01D 53/62* (2006.01)
*B01D 53/96* (2006.01)

(52) U.S. Cl.
USPC ............................ 423/220; 423/225; 423/230

(58) Field of Classification Search .................. 423/210, 423/220, 225, 230
See application file for complete search history.

(56) References Cited

U.S. PATENT DOCUMENTS
2005/0060985 A1* 3/2005 Garcia et al. ..................... 60/274

OTHER PUBLICATIONS

The Engineering Tool Box, "Thermal Conductivity of some common Materials." (2005) Viewed Feb. 1, 2011 at http://web.archive.org/web/20060216234044/http://www.engineeringtoolbox.com/thermal-conductivity-d_429.html.*

Abanades et al., "Fluidized Bed Combustion Systems Integrating CO2 Capture with CaO." Environ. Sci. Tech. (2005), 39, 2861-2866.*
Slowinski, "Some technical issues of zero-emission coal technology." Int'l J. of Hydrogen Energy, vol. 31 (2006), 1091-1102.*
"Process Optimization in Postcombustion $CO_2$—Capture by means of Repowering and Reversible Carbonation/Calcination Cycle" publication by Luis M. Romeo, et al., Centro de Investigacion Recursos y Consumos Energeticos (CIRCE) Maria de Luna, 3. Zaragoza 50018, Spain (Published by 8 Int. Conf. on Greenhouse Gas Control Technologies, Trondheim, Jun. 2006, Norway; www.GHGT8.no.), pp. 1-6.

* cited by examiner

*Primary Examiner* — Daniel C McCracken
*Assistant Examiner* — Daniel Berns
(74) *Attorney, Agent, or Firm* — Alix, Yale & Ristas, LLP

(57) ABSTRACT

A method for separating $CO_2$ from combustion exhaust gas includes discharging the $CO_2$-containing combustion exhaust gas mass flow into the carbonator of a carbonate looping system having at least one carbonator and one calciner. Combining the $CO_2$ of the combustion exhaust gas mass flow with a carbonate-forming sorbent inside the carbonator to form a carbonate. Sending the carbonate as a carbonate-solids mass flow is sent to the calciner. Burning the carbonate at the carbonate-specific calcination temperature by the addition of heat provided by an additional firing that uses oxygen as the oxidant, whereby regenerated sorbent and a gas essentially containing $CO_2$ is formed. Sending the hot regenerated sorbent to the carbonator as a sorbent-solids mass flow for carbonization of $CO_2$, and discharging the hot gas as gas mass flow. Replacing at least a portion of the heat of the additional firing with heat removed from the carbonate-solids mass flow or the gas mass flow in one or more heat exchangers prior to its entry into the calciner or inside the calciner.

9 Claims, 1 Drawing Sheet

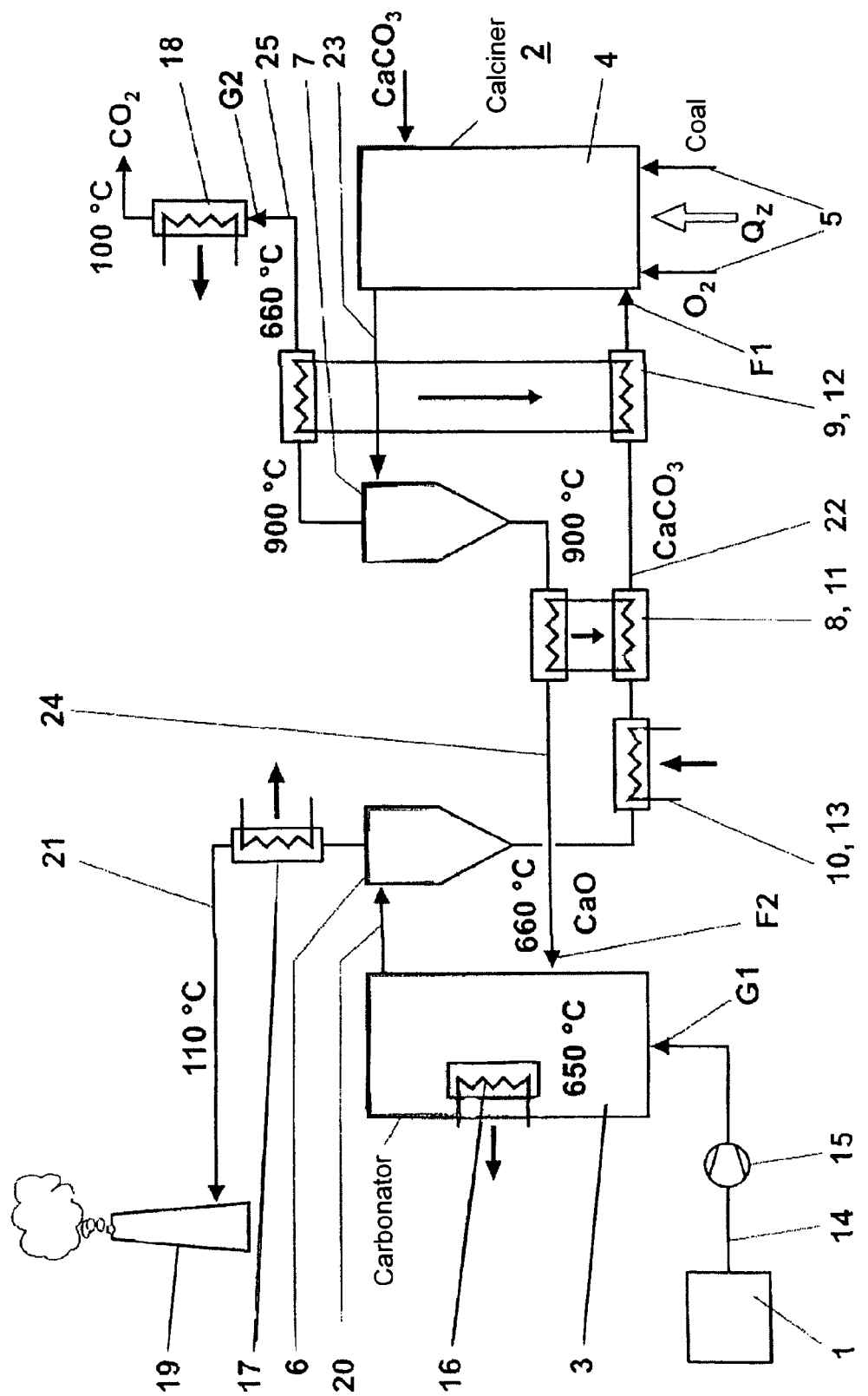

METHOD AND ARRANGEMENT FOR SEPARATION OF $CO_2$ FROM COMBUSTION FLUE GAS

BACKGROUND

This disclosure relates generally to a method and an arrangement for separating $CO_2$ from combustion exhaust gas. More particularly, this disclosure relates to a method and an arrangement for separating $CO_2$ from combustion exhaust gas that originates in a furnace through the combustion of carbon based fuels or wastes with the aid of air as an oxidizing agent.

Such a method has become known from the publication "Process Optimization in Postcombustion $CO_2$ Capture by means of Repowering and Reversible Carbonation/Calcination Cycle" by Luis M. Romeo et al., ENDESA, Spain, 8th Int. Conf. on Greenhouse Gas Control Technologies, June 2006, Trondheim, Norway.

In this known method, a large part of the $CO_2$ contained in the combustion exhaust gas is separated by means of a carbonate looping system or reversible carbonation/calcination cycle that is arranged downstream of the furnace (postcombustion) as seen in the direction of flow of the combustion exhaust gas, and is sent for further treatment. To separate the $CO_2$, the sorbent CaO, i.e., calcium oxide or unhydrated lime, is used and is carried in the loop inside the carbonate looping system. The CaO, which is produced or regenerated in the calciner at a temperature of 900-950° C., is sent at this temperature to the carbonator through a duct that connects the calciner with the carbonator. In the carbonator, into which the combustion exhaust gas containing the $CO_2$ is directed from the furnace and which has a circulating fluidized bed, at a temperature of approximately 650° C. the CaO absorbs a large part of the $CO_2$ contained in the combustion exhaust gas to the calcium carbonate CaCO3. The solids/gas mixture leaving the carbonator is sent to a separator in which the solids are separated from the combustion exhaust gas. The reduced-$CO_2$ combustion exhaust gas is sent into the atmosphere by means of a treatment facility that may be present, and the solids, essentially CaCO3 but also including ash, CaSO4 and CaO, are sent through ducts to the calciner. In the calciner, CaCO3 is heated or calcinated at a calcination temperature of 900-950° C., thereby creating one solid and one gaseous product. The solid product essentially exhibits CaO regenerated from the CaCO3 and the gaseous product essentially exhibits $CO_2$ and water. Since calcination takes place as an endothermic reaction, heat must be brought into the calciner in order to furnish the required calcination or reaction temperature. This takes place by means of an additional firing in the calciner, whereby coal is burned by means of the oxidizing agent or oxidant O2 and heat is thus brought into the calciner, which is equipped with a circulating fluidized bed. In order to avoid diluting the gaseous product that originates in the calciner, e.g., with nitrogen, thus making the separation of $CO_2$ more difficult, O2 is mandatorily used in place of air as the oxidant for the additional firing. The regenerated CaO is sent from the calciner to the carbonator as the sorbent with a product heat of approximately 900° C. With the same product heat, the gas product, which essentially contains $CO_2$, is diverted from the calciner and the $CO_2$ is sent for further treatment, and in this case cooled, compressed and transported for storage. The method described above runs continuously.

What has proven to be disadvantageous about the known method or arrangement is the fact that this method or arrangement is afflicted with a loss of efficiency of approximately 3 percentage points. This loss of efficiency can be essentially attributed to the calciner, which is equipped with additional firing and is thus fired, during which technically pure oxygen is used as the oxidant or oxidizing agent for burning the fuel, i.e., coal. In that regard, the production of oxygen for use as the oxidant in the calciner is associated with a high expenditure of energy that leads to the loss of approximately 3 efficiency percentage points.

The task of the invention is now to create a method for separating $CO_2$ from combustion exhaust gas that originates in a furnace through the combustion of carbon based fuels or wastes with the aid of air as an oxidizing agent that avoids the previously mentioned disadvantages. In particular, it is the task of the invention create a method for separating $CO_2$ from combustion exhaust gas that originates in a furnace through the combustion of carbon based fuels or wastes with the aid of air as an oxidizing agent, in which the need for additional firing, and thus the need for oxygen for the calciner, is reduced or can be eliminated entirely. It is also a task of the invention to suggest an arrangement for separating $CO_2$ from combustion exhaust gas that originates in a furnace through the combustion of carbon based fuels or wastes with the aid of air as an oxidizing agent.

SUMMARY

Through the inventive solution, a method and an arrangement for separating $CO_2$ from combustion exhaust gas that originates in a furnace through the combustion of carbon based fuels or wastes with the aid of air as an oxidizing agent is created which exhibit the following advantages:

Substantial reduction to complete elimination of the need for additional firing and thus the need for oxygen for operating the calciner, Through the reduction or elimination of the need for oxygen, the high expenditure of energy for the production of oxygen is reduced or eliminated and the loss of efficiency of the facility as a whole that occurs as the result of the production of oxygen is substantially reduced.

An advantageous further development of the invention provides that the heated and sorbent-containing solids mass flow (F2) is utilized as the external heat source, and that the removal of a part of its contained heat takes place prior to the entry of the solids mass flow (F2) into the carbonator. As a result, the additional firing rate in the calciner, and thus the need for technical oxygen, declines. The expenditure of energy for the production of oxygen and thus the loss of efficiency is reduced in this way.

In an advantageous development of the invention, the heated and $CO_2$-containing gas mass flow (G2) that is leaving the calciner is utilized as the external heat source, and the removal of a part of its contained heat takes place prior to further treatment on the heat side. Through this measure, the additional firing rate in the calciner, and thus the need for technical oxygen, declines. The expenditure of energy for the production of oxygen and thus the loss of efficiency is reduced in this way.

In an advantageous further development of the invention, an external heat source that has a higher temperature than the operating temperature that prevails inside the carbonator is utilized as the external heat source, and the removal of at least a part of the contained heat of this external heat source takes place. As was already described above, the additional firing rate in the calciner, and thus the need for technical oxygen, declines in the same way. The expenditure of energy for the production of oxygen and thus the loss of efficiency is reduced in this way.

An advantageous development of the invention provides that natural or synthetic materials are used as the sorbent. Natural sorbents are inexpensive to acquire and can be disposed of or reused without difficulty. Synthetic materials can exhibit higher mechanical and chemical stability. The required circulating amount and the amount of fresh sorbents declines in this way.

Another advantageous further development of the invention provides that CaO is used as the absorption agent. CaO in the form of limestone is inexpensive to acquire and can be disposed of or reused without difficulty.

An advantageous further development of the invention provides that the heat exchange takes place regeneratively or recuperatively. This measure allows conventional and well-proven heat exchangers to be used for the required heat exchange.

In an advantageous further development of the invention, the heat transfer takes place by means of a heat transfer medium that exhibits favorable thermodynamic properties. Through this measure, a smaller mass flow is needed for circulation, as a result of which the effort for cycling the solid material can be kept low. This results in smaller plant dimensions and lower energy consumption for the transport of solid materials. In the same way, the overall sizes for the heat exchangers, line cross sections, etc., are smaller.

An advantageous development of the invention provides that helium or sodium is used as the heat transfer medium. These heat transfer media exhibit favorable thermodynamic properties with the advantages listed above.

In a practical further development of the invention, fossil fuels or biomass or wastes or a mixture of the substances mentioned above are used for the additional firing in the calciner. The fuel costs and thus the operating costs can be kept low through this measure.

BRIEF DESCRIPTION OF THE DRAWINGS

The present disclosure may be better understood and its numerous objects and advantages will become apparent to those skilled in the art by reference to the accompanying drawings in which:

FIG. 1 is a schematic representation of an arrangement for separation of $CO_2$ from combustion exhaust gas, i.e., a carbonate looping system downstream of a furnace (postcombustion).

DETAILED DESCRIPTION

FIG. 1 shows in schematic form an arrangement for separation of $CO_2$ from combustion exhaust gas, i.e., a carbonate looping system 2.

The carbonate looping system 2, which is arranged downstream, in the direction of flow of the combustion exhaust gas, of a furnace 1 (postcombustion), comprises a carbonator 3 with separator 6, as well as a heat exchanger 16, a calciner 4 with additional firing 5 and separator 7, a heat transfer system 8 or a heat exchanger 11, a heat transfer system 9 or a heat exchanger 12, as well as a heat transfer system 10 or a heat exchanger 13, which communicates with an external heat source, not shown. Provided additionally are heat exchanger devices 17, 18 downstream of the separators 6, 7 for cooling the gases.

The combustion exhaust gas G1 leaving the furnace 1 and containing $CO_2$, which originates in the furnace 1 through the combustion of carbon based fuels or wastes with the aid of air as an oxidizing agent, is sent to the carbonator 3 of the carbonate looping system 2 through a duct 14 and a fan 15. To separate a large part of the $CO_2$ contained in the combustion exhaust gas G1, the sorbent CaO, i.e., calcium oxide or quicklime, is used and is carried in the loop inside the carbonate looping system 2. The CaO, which is produced or regenerated in the calciner 4 at a temperature $T_{calc}$ of 900-950° C., is sent at this temperature to the carbonator 3 by means of ducts 23, 24.

In the carbonator 3, which has a circulating fluidized bed, at a temperature $T_{carbonator}$ of approximately 650° C. the CaO sorbent binds a large part of the $CO_2$ contained in the combustion exhaust gas G1 to the calcium carbonate $CaCO_3$. The solids/gas mixture leaving the carbonator 3 is sent via a duct 20 to a separator 6 in which the solids are separated from the combustion exhaust gas. The reduced-$CO_2$ combustion exhaust gas is sent via a duct 21 and a stack 19 or something similar into the atmosphere, whereby heat can still be removed from the reduced-$CO_2$ combustion exhaust gas by means of a heat exchanger 17 prior to discharge into the atmosphere. The solids, essentially containing $CaCO_3$ but also including ash, $CaSO4$ and CaO, are sent as carbonate-solids mass flow F1 through a duct 22 to the calciner 4.

In the calciner 4, $CaCO_3$ is burned or calcined at a temperature $T_{calc}$ of 900-950° C., thereby creating one solid and one gaseous product. The solid product essentially exhibits CaO or sorbent regenerated from the $CaCO_3$ and the gaseous product essentially exhibits $CO_2$ and water. Since calcination takes place as an endothermic reaction, heat must be brought into the calciner 4 in order to furnish the required calcination or reaction temperature $T_{calc}$. This takes place by means of an additional firing 5 in the calciner 4, whereby coal is burned by means of the oxidizing agent or oxidant O2 and heat QZ is thus brought into the calciner 4, which is equipped with a circulating fluidized bed. In order to avoid diluting the gaseous product that originates in the calciner 4, e.g., with nitrogen, thus making the separation of $CO_2$ more difficult, $O_2$ is mandatorily used in place of air as the oxidant for the additional firing. The regenerated CaO sorbent is diverted from the calciner 4 in the form of a solid product as well as gas product essentially containing $CO_2$ with a product heat of approximately 900° C., and is sent via a duct 23 to a separator 7 in which the sorbent or the solid product is separated from the gas. Starting from the separator 7, the hot sorbent at approximately 900° C. is sent in the form of the solids mass flow F2 via a duct 24 to the carbonator 3. The hot gas product, which is at approximately 900° C. and which essentially contains $CO_2$, is diverted in the form of gas mass flow G2 from the separator 7 and is sent via a duct 25 for further treatment, whereby the $CO_2$ can be cooled, compressed and transported for storage, for example. A heat exchanger 18, for example, can be used for the cooling. The method described above runs continuously.

According to the invention, the addition of heat QZ that took place by means of the additional firing 5 for maintaining the calcination temperature $T_{calc}$ inside the calciner 4 is replaced in part or entirely, in that heat is removed from one or more heat source(s) and is sent through indirect heat exchange by means of heat exchangers 11, 12, 13 or through heat transfer by means of heat transfer systems 8, 9, 10 to the carbonate-containing carbonate-solids mass flow F1 prior to its entry into the calciner 4 or inside the calciner 4. FIG. 1 shows by way of example the removal of heat from three heat sources and by means of heat transfer systems 8, 9, 10, whereby part of the heat is removed from the sorbent-solids mass flow F2, which contains sorbent and is directed through duct 24, another part of the heat is removed from gas mass flow G2, which contains $CO_2$ and is directed through duct 25, and a further part of the heat is removed from an external heat source, not shown. In that regard, the external heat source has a higher temperature than the operating temperature $T_{carbonator}$ that prevails in the carbonator 3. In place of the three heat sources listed by way of example, only two or one of the shown heat sources can also be used in order to partly or entirely replace the addition of heat QZ that took place by means of the additional firing 5 to maintain the calcination temperature $T_{calc}$ inside the calciner 4. Moreover, heat exchangers 11, 12, 13 or a heat transfer system at a heat source and a heat exchanger at another heat source can be used in place of the heat transfer systems 8, 9, 10. For example, hot combustion exhaust gas from the furnace 1 or a hot medium from an external facility, not shown, can be utilized as an external heat source.

Through the inventive addition of heat from one or more heat source(s) to maintain the calcination temperature $T_{calc}$ inside the calciner 4 and thus the partly or entirely replaced addition of heat QZ by means of the additional firing 5, a large part or all of the need for oxygen or $O_2$ (in the form of a technical gas) for the burning of the coal in the additional firing 5 can be saved. As a result, the expenditure of energy for the production of oxygen and the loss of efficiency of the facility that occurs with it can be substantially reduced.

Along with the CaO mentioned as the sorbent by way of example, natural or synthetic materials that form a carbonate during carbonizing in the carbonator 3 can also be used. These can be dolomites, limestones or pretreated natural sorbents, for example.

The heat exchangers 11, 12, 13 provided for the heat exchange can be regenerative or recuperative in design. In addition, the heat transfer systems 8, 9, 10 provided for the heat exchange possess a heat exchange medium that exhibits favorable thermodynamic properties, e.g., high thermal capacity. Helium or sodium is preferably used as the heat transfer medium.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An improved method for separating $CO_2$ from combustion exhaust gas produced in a furnace through the combustion of carbon based fuels or wastes with air as an oxidizing agent, the method comprising the following steps:

discharging the $CO_2$-containing combustion exhaust gas mass flow from the furnace into a carbonator of a carbonate looping system, the carbonate looping system including at least one carbonator and at least one calciner and having a carbonate-forming sorbent flowing within the loop;

combining the sorbent with the $CO_2$ of the combustion exhaust gas mass flow within the carbonator to form a carbonate;

sending the carbonate as a carbonate-solids mass flow to the calciner;

burning the carbonate in the calciner at a carbonate-specific calcination temperature by adding heat produced by an additional firing that uses oxygen as the oxidant, whereby a regenerated sorbent and a gas substantially containing $CO_2$ are formed;

sending the hot regenerated sorbent to the carbonator as a sorbent-solids mass flow for carbonization of $CO_2$; and sending the hot gas as a gas mass flow for further treatment;

wherein the improvement comprises replacing at least a portion of the additional firing with heat that is removed from one or more heat sources and is sent through indirect heat exchange to the carbonate-solids mass flow before the carbonate-solids mass flow enters the calciner; and wherein the sorbent-solids mass flow is used as a heat source and the removal of a part of its contained heat by the carbonate-solids mass flow takes place in a heat exchanger prior to the entry of the sorbent-solids mass flow into the carbonator, the heat exchanger physically separating the carbonate-solids mass flow from the sorbent-solids mass flow.

2. The method of claim 1, wherein the gas mass flow leaving at a separator downstream of the calciner is used as a heat source, and the removal of a part of its contained heat takes place prior to a further treatment.

3. The method of claim 1, wherein an external heat source that has a higher temperature than the operating temperature inside the carbonator is utilized as a heat source, and the removal of at least a part of the contained heat of this external heat source takes place.

4. The method of claim 1, wherein natural or synthetic materials are used as the sorbent.

5. The method of claim 1, wherein CaO is used as an absorption agent.

6. The method of claim 1, wherein the heat exchange takes place regeneratively or recuperatively.

7. The method of claim 1, wherein fossil fuels or biomass or wastes or a mixture of the substances mentioned above are used for the additional firing in the calciner.

8. The method of claim 1, wherein the heat transfer takes place by means of a heat transfer medium that exhibits favorable thermodynamic properties.

9. The method of claim 8, wherein helium or sodium is used as the heat transfer medium.

* * * * *